R. J. BARR.
TIRE HOLDER.
APPLICATION FILED MAR. 11, 1920.
1,366,239.   Patented Jan. 18, 1921.
2 SHEETS—SHEET 2.
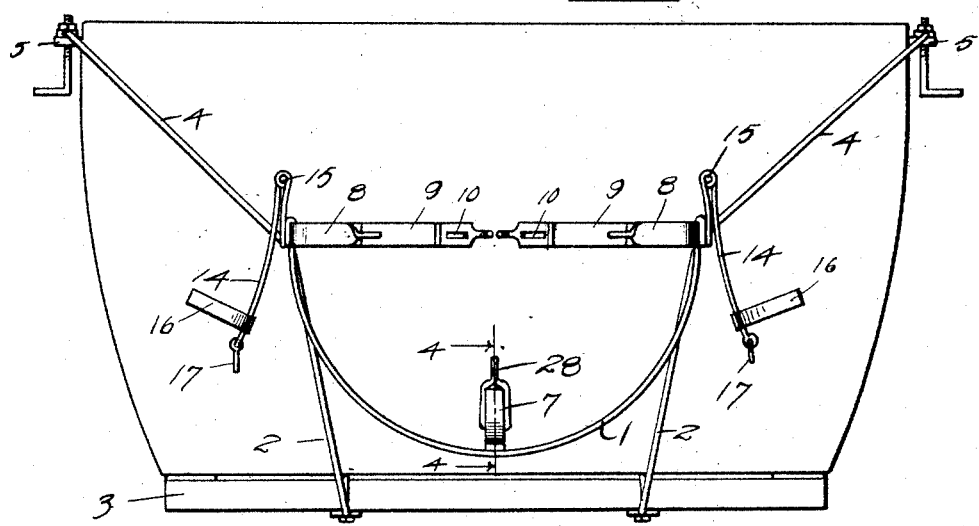
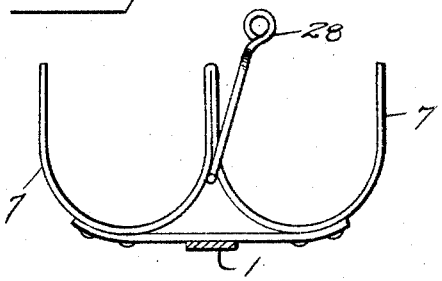
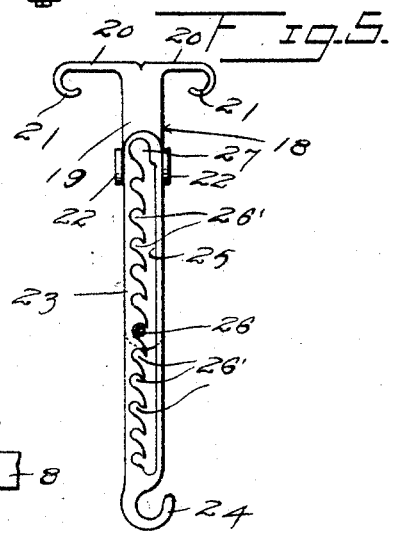
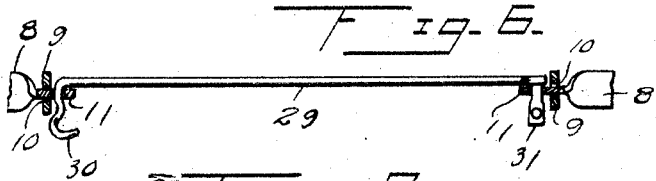
Inventor
R. J. Barr
By [signature], Atty

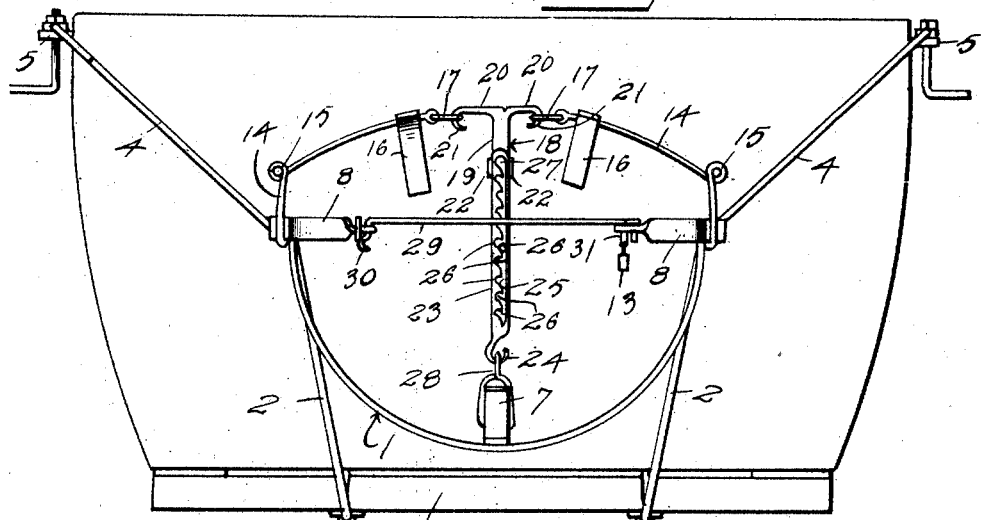
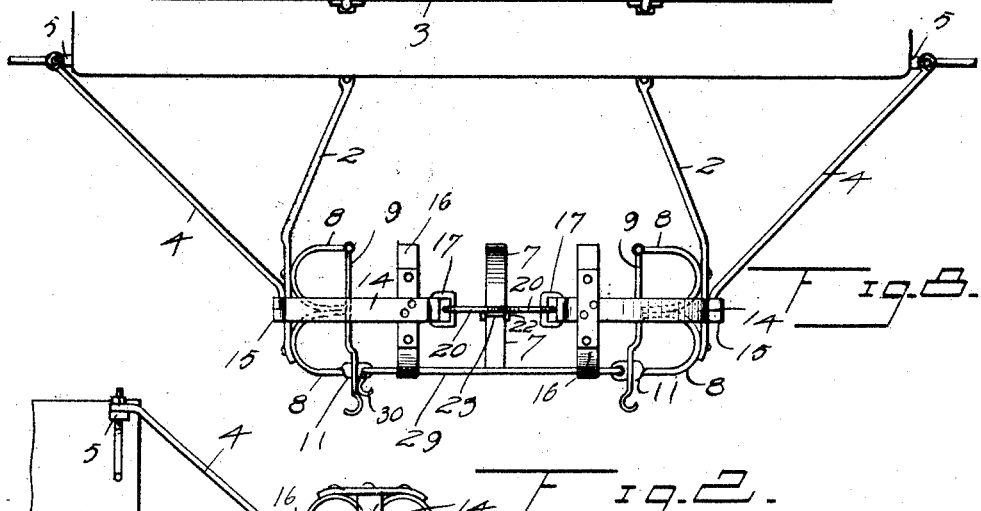
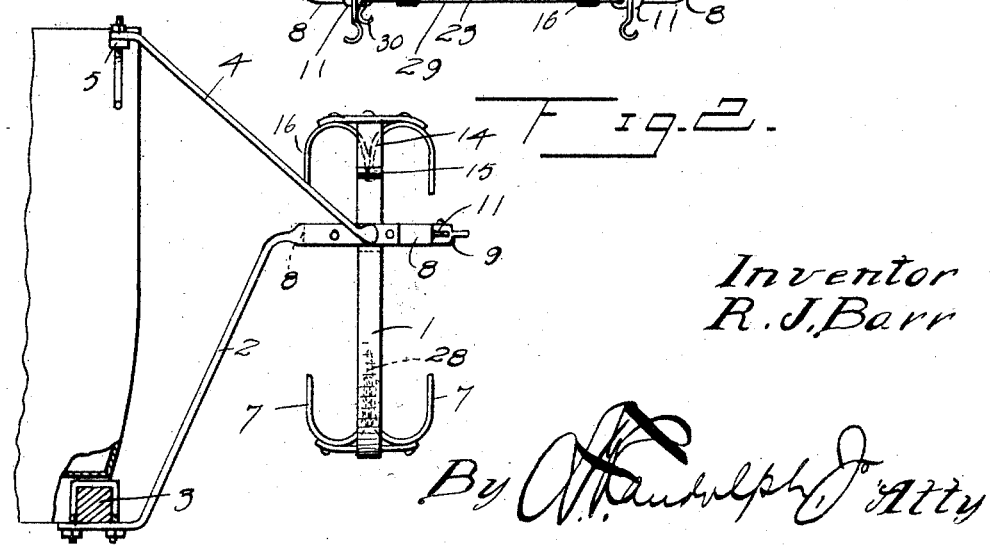

UNITED STATES PATENT OFFICE.

ROBERT J. BARR, OF GOODYEAR, ARIZONA.

TIRE-HOLDER.

1,366,239.  Specification of Letters Patent.  Patented Jan. 18, 1921.

Application filed March 11, 1920. Serial No. 365,055.

*To all whom it may concern:*

Be it known that I, ROBERT J. BARR, a citizen of the United States, residing at Goodyear, in the county of Maricopa and State of Arizona, have invented certain new and useful Improvements in Tire-Holders; and I do hereby declare the following to be a full, clear, and exact description of the invention, such as will enable others skilled in the art to which it appertains to make and use the same.

This invention relates to new and useful improvements in tire holders and has for its primary object the provision of means whereby a tire can be supported at four points thereby obviating any undue movement of the tire within the holder when the vehicle or automobile passes over uneven roadway and also the provision of means which will lock the tire against theft while inflated or deflated.

Another object of this invention is the provision of a tire holder of the above stated character, which shall be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a front elevation of a tire holder constructed in accordance with my invention, Fig. 2 is a side elevation of the same, Fig. 3 is a front elevation of the holder in an open position, Fig. 4 is a transverse sectional view of the holder, Fig. 5 is a plan view of a fastening element, Fig. 6 is a side elevation of a locking bar, Fig. 7 is an end view of the same, Fig. 8 is a top plan view of the holder in a non-tire supporting position.

Referring in detail to the drawings the numeral 1 indicates an arcuate shaped supporting body which has its ends disposed uppermost and to which are connected forwardly and downwardly extending supporting braces 2 which are secured in any well known manner to the frame or chassis 3 of an automobile or like vehicle so that the body 1 is supported in a substantially vertical plane. Supporting braces 4 are connected to the ends of the body 1 and extend upwardly and outwardly and have their free ends detachably connected to the body of the automobile. These ends of the supporting bars or members 4 are preferably secured to the irons 5 that are employed for supporting the top of the automobile when in a lowered position.

A pair of substantially U-shaped tire receiving elements 7 are formed upon the body 1 intermediate its ends and are adapted to receive and support tires either when inflated or deflated. Pairs of substantially U-shaped tire supporting members 8 are secured to the body 1 adjacent the ends thereof and receive the tires positioned within the tire supporting elements 7. Locking arms 9 are pivoted to one of the arms of one of the tire supporting elements 8 and are provided with slots 10 to receive apertured extensions 11 formed on the arms of the other tire supporting elements 8 so that said locking bars close the tire supporting elements 8 and prevent the tires from being removed therefrom. Pad-locks 13 may be passed through the apertured extensions for preventing the locking bars 9 from being swung on their pivots.

Arcuate shaped arms 14 are formed on the ends of the body 1 and each includes a pair of sections that are connected together by a hinge 15. Pairs of substantially U-shaped tire receiving members are formed or secured on the arms 14 adjacent their free ends and are adapted to be swung into engagement with the tires supported by the body 1 and said arms 14 are provided with rings 17 in their ends to be engaged by a fastening element 18 so that the tire engaging elements 16 will be held firmly in engagement with the tire and prevent said tire from moving vertically in relation to the body 1.

The fastening element 18 consists of a substantially T-shaped body 19 which has the ends of its arm portions 20 bent to form hooks 21 adapted to engage in the rings in the end of the arm 14 when not supporting a tire. Guide flanges 22 are formed on the leg portions of the body 19 and slidably receive a plate 23 which has formed on one end a hook 24. The plate 23 is provided with a slot 25 to receive a stud 26 formed on the leg of the plate 19 and is provided with offset notches 26' so that said plate can be held at adjusted positions in relation to the T-shaped body 19. One end of the slot 25 terminates in a circular opening 27 to permit rotation of the plate on the stud 26 when said stud is disposed in the circular opening. The hook 24 of the plate 23 is adapted to engage in a ring 28 carried by the tire receiving element 7 so as to hold the arms 17 against accidental movement when not supporting a tire, thereby reducing or preventing noise that would be caused by said movable parts if they were left free. When the device is supporting tires, the hook 24 is placed into one of the rings on one of the arms 14 while one of the hooks 21 of the body 19 is placed in the other ring of the other arm so that said arms will be held tightly against the tires.

Instead of using two pad-locks to fasten the tires within their respective tire receiving elements, a locking bar 29 is provided which has one end bent to form a substantially S-shaped hook 30 which is adapted to be passed through one of the apertured extensions to pivotally connect the locking bar. The other end of the locking bar has formed thereon an apertured stud 31 which extends through the other apertured extension to receive a pad-lock. Thus it will be seen that both of the locking bars 9 are held in engagement with their respective extension, thereby preventing the tire from being removed from the holder by unauthorized persons.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A tire holder comprising an arcuate shaped body, pairs of tire receiving elements carried by said body, locking arms hinged to some of said tire receiving elements and having slots therein, apertured extensions formed on some of the tire receiving elements and extending through the slots in the locking arms, a locking bar having one end bent to form a hook disposed within one of the apertured extensions, a slotted stud formed on the other end of the locking bar and received by the other apertured extension and adapted to receive a pad-lock.

2. A tire holder comprising a body, tire receiving elements carried by said body, locking means for the tire receiving elements, arms hinged to said body, tire receiving elements carried by said arms, a plate detachably connected to said arms, a second plate adjustably connected to the first named plate and having a hook, and a ring carried by one of the first named tire receiving elements to be engaged by the hook of the second mentioned plate.

In testimony whereof I affix my signature in presence of two witnesses.

ROBERT J. BARR.

Witnesses:
 JOE T. BRYANT,
 GEO. C. THOMPSON.